United States Patent
Henry et al.

(10) Patent No.: US 7,114,019 B2
(45) Date of Patent: Sep. 26, 2006

(54) SYSTEM AND METHOD FOR DATA TRANSMISSION

(75) Inventors: Trenton B. Henry, Austin, TX (US); Henry Wurzburg, Austin, TX (US); Richard C. Counts, Cedan Park, TX (US); Christopher D. Sawran, Round Rock, TX (US)

(73) Assignee: Standard Microsystems Corporation, Hauppauge, NY (US)

( * ) Notice: Subject to any disclaimer, the term of this patent is extended or adjusted under 35 U.S.C. 154(b) by 0 days.

(21) Appl. No.: 09/949,288

(22) Filed: Sep. 7, 2001

(65) Prior Publication Data

US 2002/0116561 A1   Aug. 22, 2002

Related U.S. Application Data

(60) Provisional application No. 60/231,391, filed on Sep. 8, 2000.

(51) Int. Cl.
*G06F 13/00* (2006.01)

(52) U.S. Cl. .................................. 710/100; 710/61

(58) Field of Classification Search .................. 710/53, 710/61, 100
See application file for complete search history.

(56) References Cited

U.S. PATENT DOCUMENTS

| | | | | |
|---|---|---|---|---|
| 5,724,539 | A | * | 3/1998 | Riggle et al. ............... 711/100 |
| 6,018,778 | A | * | 1/2000 | Stolowitz .................... 710/61 |
| 6,088,744 | A | * | 7/2000 | Hill ............................. 710/53 |
| 6,477,143 | B1 | | 11/2002 | Ginossar |
| 6,477,181 | B1 | | 11/2002 | Fujimori et al. |
| 6,496,583 | B1 | | 12/2002 | Nakamura et al. |

\* cited by examiner

*Primary Examiner*—Khanh Dang
(74) *Attorney, Agent, or Firm*—Meyertons Hood Kivlin Kowert & Goetzel, P.C.; Jeffrey C. Hood; Erik A. Heter

(57) ABSTRACT

An interface chip is disclosed. In one embodiment, an interface chip includes a processor coupled to an internal data bus and an internal address bus. A plurality of interfaces, including at least on serial interface and at least one parallel interface are also coupled to the processor via the internal address bus and the internal data bus. The interface chip also includes data movement circuitry, wherein the data movement circuitry is configured for transmitting data between a first of the plurality of interfaces and a second of the plurality of interfaces using time division multiplexing.

45 Claims, 4 Drawing Sheets

SYSTEM AND METHOD FOR DATA TRANSMISSION

This application claims benefit of priority of U.S. provisional application Ser. No. 60/231,391 titled "Novel Data Transmission Architecture" filed Sep. 8, 2000, whose inventors were Trenton B. Henry, Henry Wurzburg, Richard C. Counts, and Christopher D. Sawran.

BACKGROUND OF THE INVENTION

1. Field of the Invention

This invention relates to computer systems, and more particularly, to data transmission between various units of a computer system.

2. Description of the Related Art

Computer systems typically include a several chips for the purpose of data transmission to and from peripheral devices. FIG. 1 is a block diagram of one embodiment of a peripheral controller chip. A typical peripheral controller chip includes various functional units. Such functional units may include a microcontroller/CPU, a serial interface engine (SIE), one or more peripheral interfaces, a memory management unit (MMU) and a direct memory access controller (DMAC) associated with each interface. The microcontroller/CPU may be a simple (and sometimes low-speed) processor which manages the data flow within the chip from one interface to another. The SIE may include logic that translates a data format between a serial data stream of a serial bus to a parallel data stream internal to the chip. Similarly, any peripheral interface may perform data translations between a format suitable for the peripheral bus and the format of data internal to the chip. The MMU may include a FIFO (first-in first out) memory, as in the embodiment shown, or a dual-ported static random access memory (SRAM) in other embodiments. The FIFO or the SRAM of the MMU may provide temporary storage for data being transmitted between two interfaces to allow rate adaptation and/or flow control between the interfaces. A DMAC associated with each interface may control data transfers between the MMU and the various external interfaces. The chip may also include an internal address and data bus to accommodate the data transfers internal to the chip.

Such devices as the one described above may experience significant delays and latencies during their operation. Each functional unit transmitting data internal to the chip must first acquire control of the internal data and address buses. Thus, other functional units needing to transmit and/or receive data may be delayed until the buses are released. The process of acquiring and releasing the bus by each of the functional units may slow down the movement of data through the chip. This may also result in more demanding processing requirements for the microcontroller/CPU. As a result, many such chips may not be suitable for use in systems that require high-speed data movement. Furthermore, since the bandwidth of the FIFO or SRAM (i.e. the ability to read from or write to) is much greater than the required bandwidth for data transmissions between one functional unit and another, MMU utilization may be very inefficient.

Another performance issue may deal with the type of data being transmitted. In some cases, the data being transferred between two function units may include commands, which may need to be intercepted and interpreted by the MCU/CPU.

In addition to the performance drawbacks, such chips may be expensive to implement. In particular, the need for DMACs may significantly increase the cost of a given device. Such devices may also require a bus arbiter in order to arbitrate access to the internal buses. Adding a bus arbiter may further add to both the complexity and expense of such a device, as well as increasing the complexity of other logic that must interface with the bus arbiter. A FIFO memory that may be employed in some embodiments may consume a significant amount of chip area.

In general, many such devices with greater logic complexity may be more costly to implement and yet still may not meet the requirements for high-speed data transmission.

SUMMARY OF THE INVENTION

An interface chip is disclosed. In one embodiment, the chip is a peripheral controller in a computer system. The peripheral controller includes a microcontroller/processor (MCU/CPU) coupled to an internal data bus and an internal address bus. One or more interfaces, including either one serial interface or one parallel interface are also coupled to the processor via the internal address bus and the internal data bus. The interface chip also includes data movement circuitry, wherein the data movement circuitry is configured for transmitting data between a first of the plurality of interfaces and a second of the plurality of interfaces using time division multiplexing. The use of time division multiplexing for the interfaces and the MCU/CPU may guarantee a certain amount of bandwidth to each of these units.

In one embodiment, the data movement circuitry of the interface chip may include N latches coupled to the data bus, wherein N is an integer value corresponding to the number of interfaces in the interface chip. The latches may be data latches, and may provide access to the data bus for each of the N interfaces. A static random access memory (SRAM) may be coupled to each of the latches. The data movement circuitry may also include N address generators. The address generators may generate addresses in the SRAM, and may be under control of one or more of the interfaces or the processor. One of each of the address generators may correspond to one of the latches. The data movement circuitry also includes a phase clock generator, wherein the phase clock generator is configured to generate a clock signal with N phases. Each of the N phases of the clock signal corresponds to one of the interfaces in the interface chip. Data may be transmitted between the interfaces across the data bus in frames, wherein each of the frames includes N time divisions.

Various types of interfaces may be incorporated into different embodiments of the interface chip. The interfaces may include both serial and parallel interfaces. In one embodiment, a Universal Serial Bus Interface (USB) may be present. Other types of interfaces include peripheral component interconnect (PCI), general purpose I/O (GPIO), industry standard architecture (ISA), advanced graphics port (AGP), general purpose interface bus (GPIB), integrated drive electronics (IDE) and virtually any other type of interface architecture.

By employing data movement circuitry which moves data between interface units using time division multiplexing, it may be possible to implement the interface chip without using a memory management unit. This may result in a significant reduction of both the complexity and the cost for the interface chip. In addition, it may be possible to eliminate DMAC (direct memory access controller) circuitry from some embodiments.

The design may also be scalable. Expanding the capacity of the interface chip may include adding additional SRAM, latches, address generators, and interfaces. The clock signal may also be divided into additional phases to match the number of interfaces. In general, there is no theoretical limit to the number of interfaces that may be present in the interface chip.

BRIEF DESCRIPTION OF THE DRAWINGS

Other aspects of the invention will become apparent upon reading the following detailed description and upon reference to the accompanying drawings in which.

Figure 1:
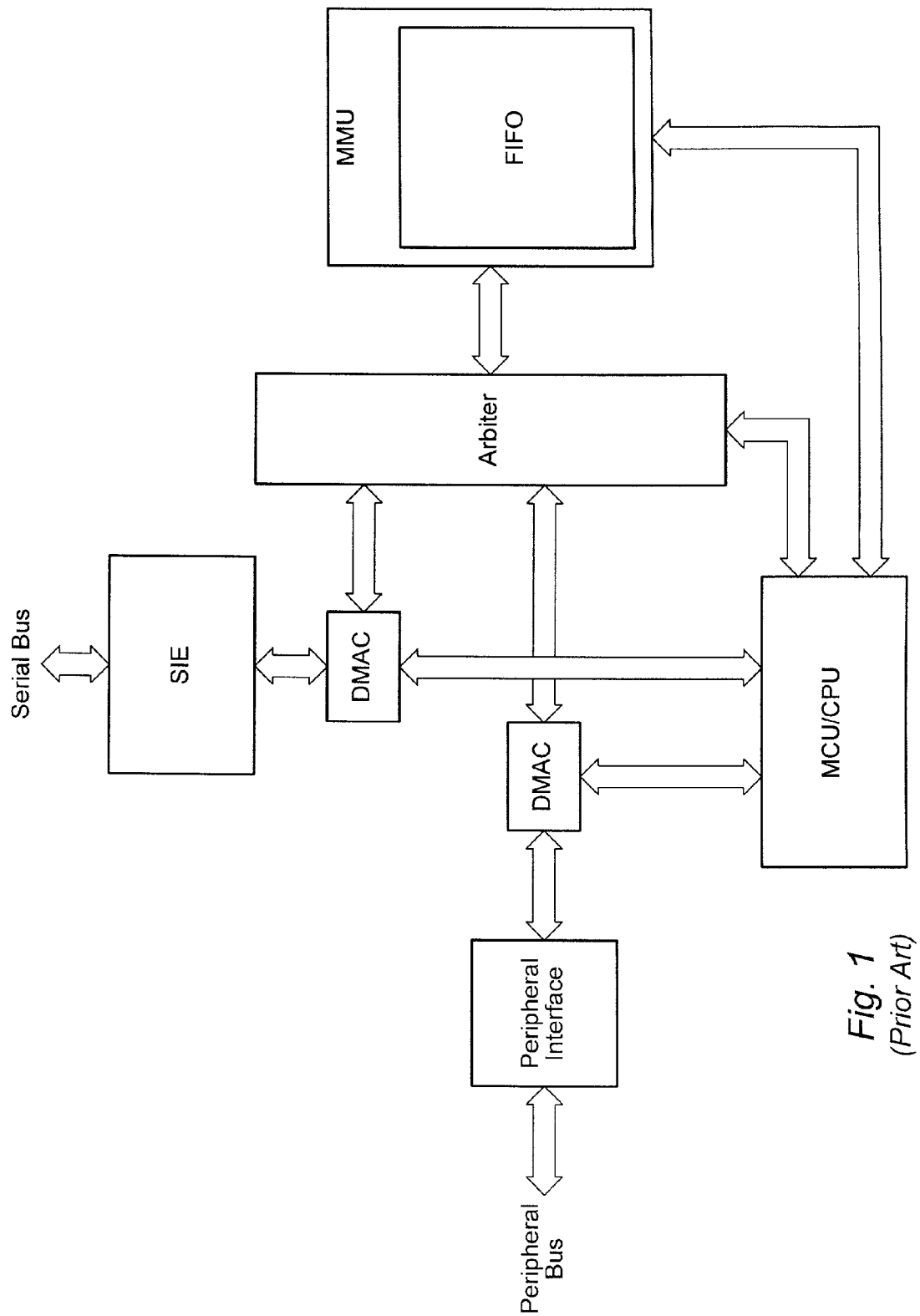
FIG. 1 (Prior Art) is a block diagram of one embodiment of an interface chip.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

Figure 2:
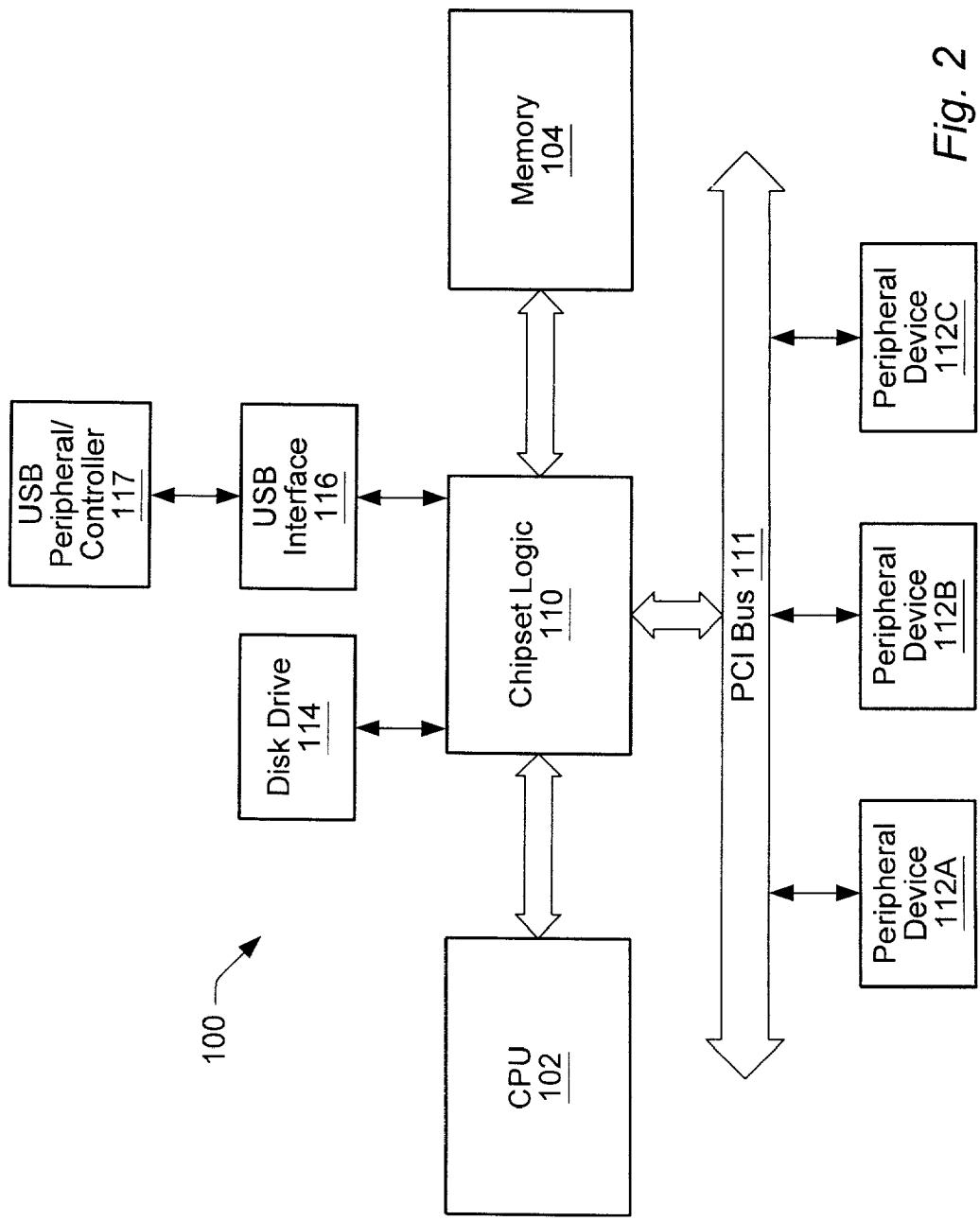
FIG. 2 is a block diagram of one embodiment of a computer system implementing an interface chip as a peripheral controller.

Moving now to FIG. 2, a block diagram of one embodiment of a computer system implementing an interface chip as a peripheral controller. Computer system 100 includes a central processing unit (CPU) 102. Embodiments having multiple instances of CPU 102 are possible and contemplated. CPU 102 is coupled to memory 104 by chipset logic 110. Chipset logic 110 may provide a wide variety of I/O functions for computer system 100. Chipset logic 110 may be coupled to a peripheral component interconnect (PCI) bus 111. PCI bus 111 may allow for the coupling of a plurality of peripheral devices (such as peripheral devices 112A, 112B, and 112C shown here). Chipset logic 110 may also be coupled to disk drive 114 and universal serial bus (USB) interface 116. USB interface 116 may be a USB port, and may be coupled to USB peripheral/controller 117. Chipset logic 110 may be implemented using one or more interface chips, such as the one which will now be described in reference to FIG. 3.

Figure 3:
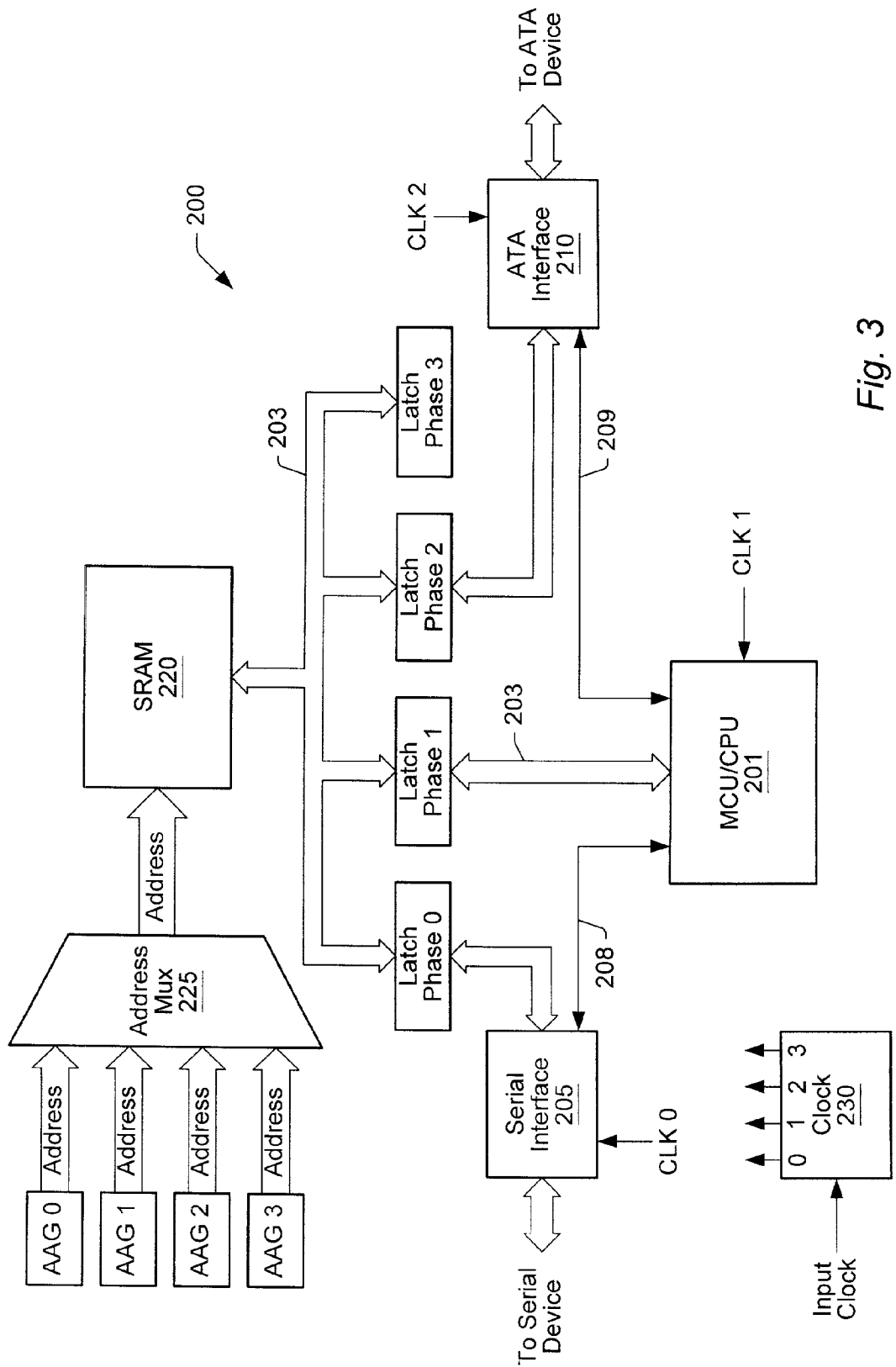
FIG. 3 is a block diagram of one embodiment of an interface chip configured for data transmissions using time-division multiplexing.

Turning now to FIG. 3, a block diagram of one embodiment of an interface chip configured for data transmissions using time-division multiplexing is shown. Other embodiments are possible and contemplated. Interface chip 200 may be a peripheral controller, such as USB peripheral/controller 117 of FIG. 2. Interface chip 200 includes by a microcontroller or CPU, shown here as MCU/CPU 201, in order to provide various control functions. MCU/CPU 201 is coupled to both serial interface 205 and ATA interface 210 by control lines 208 and 209, respectively, and may provide certain control functions to these interfaces. The interface chip includes a data bus 203. Data bus 203 is coupled to a static random access memory (SRAM) 220. In the embodiment shown, SRAM 220 is a single-ported SRAM, and may provide buffering of data transferred within the chip. Data bus 203 is also coupled to a plurality of latches, designated here as latch phase 0, latch phase 1, etc. In various embodiments, there may be up to N latches, where N is an integer value. For the embodiment shown, N=4.

Latch phases 0, 1, and 2 are each coupled to an interface of the interface chip. Latch phase 0 is coupled to serial interface 205 by data bus 203. Serial interface 205 may provide an interface to a serial bus, such as a universal serial bus (USB). Latch phase 2 in this embodiment is coupled to a parallel interface, ATA (Advanced Technology Attachment) interface 210. ATA interface 201 may provide an interface to an ATA device, such as a disk drive or a CD-ROM drive. Latch phase 1 is coupled to MCU/CPU 201 via data bus 203. In the example shown, latch phase 3 is shown as unused for the sake of simplicity. Latch phase 3 may also be coupled to an interface via data bus 203 in some embodiments, or may be reserved for future use in others.

Data bus 203 may be shared by each of the interfaces to which it is coupled, as well as MCU/CPU 201. The sharing of data bus 203 may be accomplished using time division multiplexing. Clock divider 230 may be used to divide an input clock signal into N different phases. This may allow each of the interfaces to have access to the data bus at a frequency that is 1/N of the input clock frequency. For example, if the input clock in the embodiment shown is 60 MHz, each of the interfaces may access data bus 203 at a rate of 15 MHz. Access to the data bus for each of the interfaces is proved by the latches. For example, serial interface 205 may be granted access to the data bus by latch phase 0. Latch phase 0 is configured to receive phase 0 of the divided input clock signal in this embodiment. Similarly, ATA interface 210 may be given access to data bus 203 by latch phase 2, which is configured to receive phase 2 of the divided input clock signal.

In the embodiment shown, interface chip 200 also includes address multiplexer 225 and a plurality of address generators (AAG 0 through 3 in this embodiment). Address multiplexer 225 may be configured to select an address from one of those generated by one of the auto address generators. Data may be written to or read from SRAM 200 at the address received from address multiplexer 225. The auto address generators may be implemented using simple binary counters, which generate a new address each time they are incremented.

An example of the operation of interface chip 200 will now be presented. For the purposes of this discussion, it is assumed that data is to be transferred from serial interface 205 to ATA interface 210. It is further assumed that serial interface 205 is a USB interface.

Serial interface 205 may receive a USB packet in a serial fashion. Logic in serial interface 205 may read the USB packet endpoint (i.e. the logical destination of data in USB terminology). This may enable the appropriate address generator, which is AAG 0 in this particular example. Enabling the address generator may comprise setting a certain number of bits to a start address. The address generator, implemented as binary counter in the embodiment shown, may then be incremented by 1 for each double word that is received. The address from the address generator may be passed through address multiplexer 225 to address lines of SRAM 220. An extra bit from the address generator may also be passed through address multiplexer 225. The extra bit may be a logic 1 or logic 0, depending on the final destination of the data. For example, if the endpoint of the data is another interface (i.e. data is being transferred from serial interface 205 to another interface), a logic 1 may be passed, while a logic 0 may be passed if serial interface 205 is to receive data.

As the data is streamed from serial interface 205, it may be written directly into SRAM 220. During the writing of data to SRAM 220, there is no intervention by MCU/CPU 201. When serial interface 205 has completed the transfer of the USB packet to SRAM 220, it may then send an interrupt to MCU/CPU 201. In response to the interrupt, MCU/CPU 201 may verify that the packet was properly received and that data written into SRAM 220 is valid. In the embodiment shown, MCU/CPU 201 may accomplish this task by checking control registers present in serial interface 205.

After validating the data written into SRAM 220, MCU/CPU may initiate data movement to the receiving interface, ATA interface 210 in this example. MCU/CPU may initiate data movement by setting AAG 2 to the starting address of the packet that was written into SRAM 220. The transfer of data to ATA interface 210 may then begin with no further intervention by MCU/CPU 201. Data may be read from SRAM 220 at the starting address of the packet and transferred to ATA interface 210. AAG 2 may increment for each address to which packet data was written into SRAM 220 until the entire packet has been transferred to ATA interface 210.

During the reading out of data from SRAM 220 to ATA interface 210 (when latch phase 2 is active), serial interface 205 may continue receiving data from the universal serial bus. This data may then be transferred to SRAM 220 in a different buffer location when latch phase 0 is active, while ATA interface 210 may forward data to an attached ATA device. When latch phase 2 becomes active again, ATA interface 210 may receive data that serial interface 205 has previously written to and buffered in SRAM 220. In this manner, both serial interface 205 and ATA interface 210 may be continuously sending and/or receiving data. Thus, data may flow through interface chip in a continuous fashion.

Data transfers between two interfaces may be interleaved with data transfers between other interfaces within interface chip 200 using time division multiplexing. In the example above, it may be possible for another data transfer between two interfaces to be interleaved with the data transfer from serial interface 205. Each interface may be granted access to the data bus at a frequency that is 1/N of the input clock frequency. Transfers of data typically involve reading from or writing to SRAM 220. Thus, it is possible for each device to perform a read or write with respect to SRAM 220 during the time division in which it is granted access to the data bus.

Figure 4:
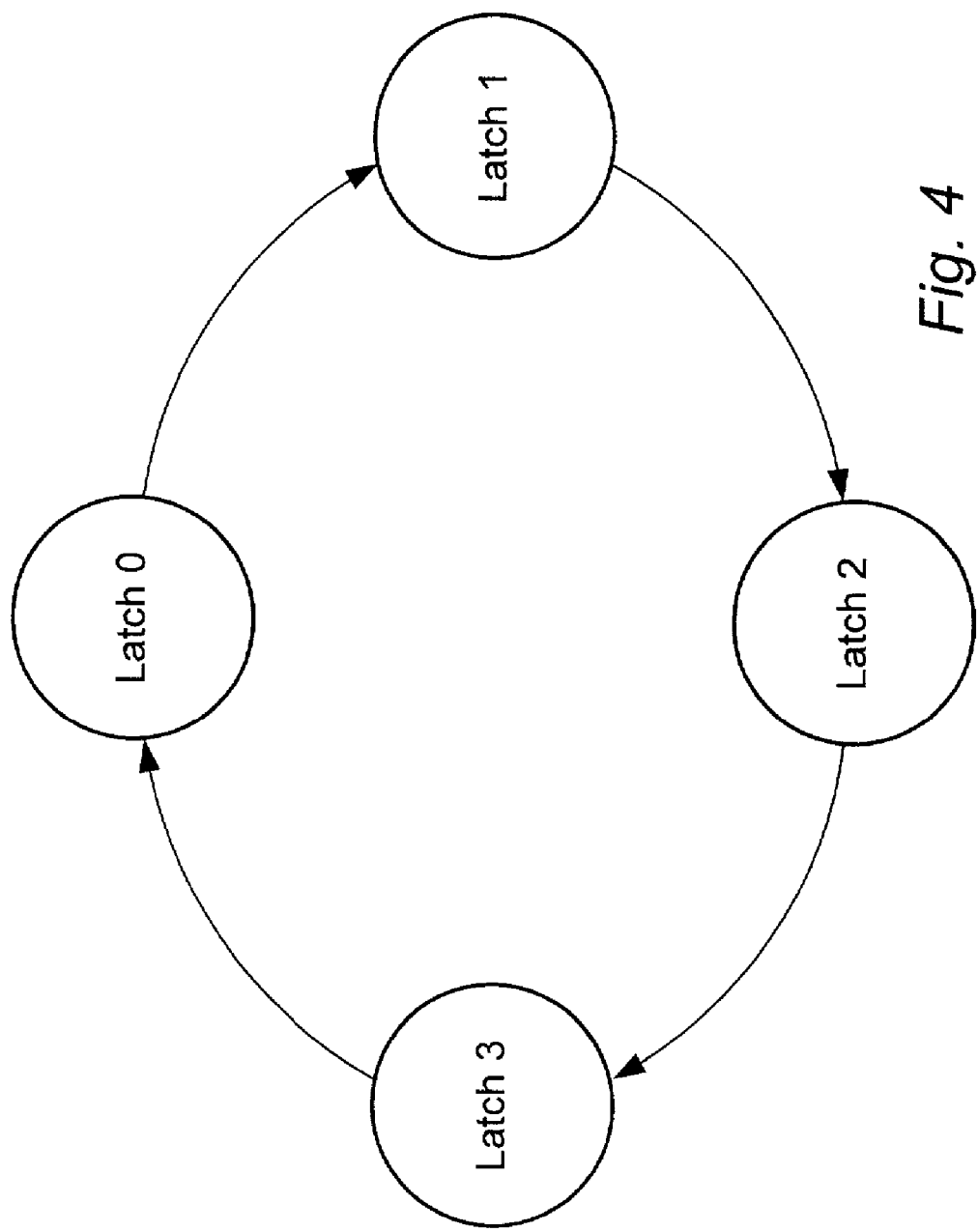
FIG. 4 is a diagram illustrating the operation of one embodiment of the interface chip using time division multiplexing.

Moving now to FIG. 4, a diagram illustrating the operation of one embodiment of the interface chip using time division multiplexing is shown. During the operation of interface chip 200 of FIG. 3, the various devices are granted access to the data bus in a "round robin" fashion using time-division multiplexing. Latch 0 may be activated, thereby granting access to the data bus for serial interface 205 at a clock rate that is, in this particular embodiment, ¼ of the clock rate at which SRAM 220 of FIG. 3 may be accessed. Latch 1 may be activated upon the deactivation of Latch 0, and may grant data bus access to MCU/CPU 201. Latch 2 may be activated when Latch 1 is deactivated, granting data bus access to ATA interface 210. The data bus may be in an idle state when Latch 3 is activated, as the embodiment shown does not utilize this latch to couple an interface to the bus. Other embodiments are possible and contemplated wherein Latch 3 is used to couple an interface to the data bus. Following the deactivation of Latch 3, Latch 0 is again activated, and this cycle may continue throughout the operation of interface chip 200. In addition, embodiments with a greater or lesser number of latches (and hence, time divisions) are possible and contemplated.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. An interface system for interfacing to one or more peripheral devices, the interface system comprising:
    a data bus;
    a first plurality (N) of interfaces, wherein at least two of the interfaces are of different types, wherein each of the N interfaces comprises a respective clock input;
    a first plurality (N) of latches, wherein each of the N latches is configured to couple a corresponding one of the N interfaces to the data bus, wherein each of the N latches comprises a respective clock input;
    a data buffer coupled to each of the N latches via the data bus; and
    clock generation circuitry which is operable to generate N clock signals, wherein each one of the N clock signals is provided to a respective one of the N interfaces and to a corresponding respective one of the N latches;
    wherein the clock generation circuitry is operable to generate each of the N clock signals in a time division multiplexed manner to enable each respective one of the N interfaces, through its corresponding one of the N latches, to access the data buffer through the data bus, wherein each respective one of the N interfaces thereby accesses the data buffer in a time division multiplexed manner.

2. The interface system as recited in claim 1, wherein the clock generation circuitry comprises a phase clock generator, wherein the N clock signals comprise N phases of a clock signal produced by the phase clock generator, wherein each of the N phases corresponds to one of the N latches.

3. The interface system as recited in claim 1, wherein the data buffer is a static random access memory (SRAM).

4. The interface system as recited in claim 3, wherein the SRAM is a single-ported SRAM.

5. The interface system as recited in claim 3, further comprising:
    an address multiplexer coupled to the SRAM; and
    N address generators coupled to the address multiplexer, wherein each of the N address generators corresponds to one of the N latches.

6. The interface system as recited in claim 1, wherein data is transmitted in frames, and wherein each of the frames includes N time divisions, wherein each of the N time divisions corresponds to one of the N latches.

7. The interface system as recited in claim 1, wherein at least one of the N interfaces is a serial interface.

8. The interface system as recited in claim 7, wherein the serial interface is a universal serial bus (USB) interface.

9. The interface system as recited in claim 1, wherein at least one of the N interfaces is a parallel interface.

10. The interface system as recited in claim 9, wherein the parallel interface is an advance technology attachment (ATA) interface.

11. The interface system as recited in claim 10, wherein the parallel interface is a peripheral component interconnect (PCI) interface.

12. The interface system as recited in claim 1, further comprising a processor, wherein the processor is coupled to one of the N latches via the data bus.

13. The interface system as recited in claim 1, wherein the interface system does not include a memory management unit.

14. The interface system as recited in claim 1, wherein the different types comprise a parallel bus type and serial bus type.

15. The interface system as recited in claim 1, wherein the at least two interfaces of different types are operable to transfer different amounts of data to/from the data buffer during respective time periods.

16. The interface system as recited in claim 1, wherein each of the N interfaces is operable to transfer data in a direction toward the data buffer or a direction from the data buffer during a respective time period.

17. The interface system as recited in claim 1, wherein during a respective time period a respective one of the N interfaces is operable to transfer data either to the data buffer or from the data buffer.

18. The interface system as recited in claim 1,
wherein during each of at least three successive time periods, a respective one of the N interfaces is operable to transfer data either to the data buffer or from the data buffer.

19. The interface system as recited in claim 1,
wherein, in a time period, each one of the N clock signals is provided to a respective one of the N interfaces and to a corresponding respective one of the N latches;
wherein during the time period each of the N interfaces performs a data buffer access;
wherein at least one of the N interfaces is operable to transfer data to the data buffer during the time period, and wherein at least one of the N interfaces is operable to transfer data from the data buffer during the time period.

20. The interface system as recited in claim 1, wherein the N interfaces comprise:
a USB interface;
an ATA interface; and
a PCI interface.

21. The interface system as recited in claim 1,
wherein a first interface of the N interfaces is operable to transfer data to a second interface of the N interfaces.

22. The interface system as recited in claim 1,
wherein the interface system does not include a memory management unit.

23. The interface system as recited in claim 1,
wherein the interface system does not include a direct memory access controller.

24. The interface system as recited in claim 1,
wherein each of the N interfaces is operable to couple to at least one corresponding device;
wherein each at least one corresponding device is thereby operable to gain access to the data buffer in a time division multiplexed manner.

25. A computer system comprising:
a processor;
a memory unit coupled to the processor;
a plurality (N) of peripheral devices, wherein at least two of the peripheral devices are of different types; and
an interface system, wherein the interface system comprises:
a data bus;
a first plurality (N) of interfaces, wherein at least two of the interfaces are of different types, wherein each of the N interfaces comprises a respective clock input, wherein each one of the N interfaces is adapted to interface to a respective one of the N peripheral devices;
a first plurality (N) of latches, wherein each of the N latches is configured to couple a corresponding one of the N interfaces to the data bus, wherein each of the N latches comprises a respective clock input;
a data buffer coupled to each of the N latches via the data bus; and
clock generation circuitry which is operable to generate N clock signals, wherein each one of the N clock signals is provided to a respective one of the N interfaces and to a corresponding respective one of the N latches;
wherein the clock generation circuitry is operable to generate each of the N clock signals in a time division multiplexed manner to enable each respective one of the N interfaces, through its corresponding one of the N latches, to access the data buffer through the data bus, wherein each respective one of the N interfaces thereby accesses the data buffer in a time division multiplexed manner, and wherein each respective one of the N peripheral devices is thereby operable to access the data buffer in a time division multiplexed manner.

26. The computer system as recited in claim 25, wherein the clock generation circuitry comprises a phase clock generator, wherein the N clock signals comprise N phases of a clock signal produced by the phase clock generator, wherein each of the N phases corresponds to one of the N latches.

27. The computer system as recited in claim 26, wherein the one or more interface systems do not include a memory management unit.

28. The computer system as recited in claim 25, further comprising:
an address multiplexer coupled to the data buffer; and
N address generators coupled to the address multiplexer, wherein each of the N address generators corresponds to one of the N latches.

29. The computer system as recited in claim 25, wherein data is transmitted in frames, and wherein each of the frames includes N time divisions, wherein each of the N time divisions corresponds to one of the N latches.

30. The computer system as recited in claim 25, wherein at least one of the N interfaces is a serial interface.

31. The computer system as recited in claim 30, wherein the serial interface is a universal serial bus (USB) interface.

32. The computer system as recited in claim 25, wherein at least one of the N interfaces is a parallel interface.

33. The computer system as recited in claim 32, wherein the parallel interface is an advance technology attachment (ATA) interface.

34. The computer system as recited in claim 32, wherein the parallel interface is a peripheral component interconnect (PCI) interface.

35. The interface system as recited in claim 25, wherein the different types comprise a parallel bus type and serial bus type.

36. The interface system as recited in claim 25, wherein the at least two interfaces of different types are operable to transfer different amounts of data to/from the data buffer during respective time periods.

37. The interface system as recited in claim 25, wherein each of the N interfaces is operable to transfer data in a direction toward the data buffer or a direction from the data buffer during a respective time period.

38. The interface system as recited in claim 25, wherein during a respective time period a respective one of the N interfaces is operable to transfer data either to the data buffer or from the data buffer.

39. The interface system as recited in claim 25,
wherein during each of at least three successive time periods, a respective one of the N interfaces is operable to transfer data either to the data buffer or from the data buffer.

40. The interface system as recited in claim 25,
wherein, in a time period, each one of the N clock signals is provided to a respective one of the N interfaces and to a corresponding respective one of the N latches;
wherein during the time period each of the N interfaces performs a data buffer access;
wherein at least one of the N interfaces is operable to transfer data to the data buffer during the time period, and wherein at least one of the N interfaces is operable to transfer data from the data buffer during the time period.

41. The interface system as recited in claim 25, wherein the N interfaces comprise:
a USB interface;
an ATA interface; and
a PCI interface.

42. An interface system for interfacing to one or more peripheral devices in a computer system, the interface system comprising:
a data bus;
a first plurality (N) of interfaces, wherein each of the N interfaces comprises a respective clock input, and wherein each of the N interfaces is operable to couple to at least one corresponding device, wherein the N interfaces comprise a serial bus interface and a parallel bus interface;
a first plurality (N) of latches, wherein each of the N latches is configured to couple a corresponding one of the N interfaces to the data bus, wherein each of the N latches comprises a respective clock input;
a data buffer coupled to each of the N latches via the data bus; and
clock generation circuitry which is operable to generate N clock signals, wherein each one of the N clock signals is provided to a respective one of the N interfaces and to a corresponding respective one of the N latches;
wherein the clock generation circuitry is operable to generate each of the N clock signals in a time division multiplexed manner to enable each respective one of the N interfaces, through its corresponding one of the N latches, to access the data buffer through the data bus, wherein each respective one of the N interfaces thereby accesses the data buffer in a time division multiplexed manner, and wherein each at least one corresponding device is thereby operable to gain access to the data buffer in a time division multiplexed manner;
wherein each of the N interfaces has a certain guaranteed amount of bandwidth.

43. A peripheral controller chip for interfacing to one or more peripheral
devices in a computer system, comprising:
a data bus comprised on the peripheral controller chip;
a first plurality (N) of interfaces comprised on the peripheral controller chip, wherein each of the N interfaces comprises a respective clock input, and wherein each of the N interfaces is operable to couple to at least one corresponding device; wherein at least two of the interfaces are of different types;
a first plurality (N) of latches comprised on the peripheral controller chip, wherein each of the N latches is configured to couple a corresponding one of the N interfaces to the data bus, wherein each of the N latches comprises a respective clock input;
a data buffer comprised on the peripheral controller chip and coupled to each of the N latches via the data bus; and
clock generation circuitry comprised on the peripheral controller chip which is operable to generate N clock signals, wherein each one of the N clock signals is provided to a respective one of the N interfaces and to a corresponding respective one of the N latches;
wherein the clock generation circuitry is operable to generate each of the N clock signals in a time division multiplexed manner to enable each respective one of the N interfaces, through its corresponding one of the N latches, to access the data buffer through the data bus, wherein each respective one of the N interfaces thereby accesses the data buffer in a time division multiplexed manner, and wherein each at least one corresponding device is thereby operable to gain access to the data buffer in a time division multiplexed manner.

44. The peripheral controller chip as recited in claim 43, wherein the peripheral controller chip does not include a memory management unit.

45. The peripheral controller chip as recited in claim 43, wherein the peripheral controller chip does not include a direct memory access controller.

\* \* \* \* \*